(12) United States Patent
Betzold et al.

(10) Patent No.: US 9,854,943 B2
(45) Date of Patent: Jan. 2, 2018

(54) MODULAR FOOD HOLDING CABINET HAVING INDIVIDUALLY CONFIGURABLE FOOD HOLDING UNITS

(71) Applicant: Prince Castle, LLC., Carol Stream, IL (US)

(72) Inventors: David Anthony Betzold, Fridley, MN (US); David E Paton, Bartlett, IL (US)

(73) Assignee: Prince Castle LLC, Carol Stream, IL (US)

( * ) Notice: Subject to any disclaimer, the term of this patent is extended or adjusted under 35 U.S.C. 154(b) by 721 days.

(21) Appl. No.: 14/278,549

(22) Filed: May 15, 2014

(65) Prior Publication Data

US 2015/0327726 A1 Nov. 19, 2015

(51) Int. Cl.
*A47J 39/02* (2006.01)

(52) U.S. Cl.
CPC .................................. *A47J 39/02* (2013.01)

(58) Field of Classification Search
CPC ...... A47J 39/006; A47J 39/02; A47J 36/2483; A47J 37/103; A47J 39/00; A47J 37/0623; F24C 7/087; F24C 7/06; F24C 15/16; F24C 7/04; A21B 1/22; A21B 2/00; A47B 88/0407
See application file for complete search history.

(56) References Cited

U.S. PATENT DOCUMENTS

| D63,818 S | 1/1924 | Curtiss |
| D243,362 S | 2/1977 | Shumrak et al. |
| D341,054 S | 11/1993 | Maputol |
| D369,269 S | 4/1996 | Labadia Del Fresno |
| 5,783,803 A | 7/1998 | Robards, Jr. |
| 5,900,173 A | 5/1999 | Robards, Jr. |
| 5,914,957 A * | 6/1999 | Dean ................... G06F 13/4256 370/362 |
| D434,265 S | 11/2000 | Tatlow |
| 6,412,403 B1 | 7/2002 | Veltrop |
| 6,637,322 B2 | 10/2003 | Veltrop |
| 6,878,391 B2 | 4/2005 | Veltrop |
| 6,884,451 B2 | 4/2005 | Veltrop |
| 7,105,779 B2 | 9/2006 | Shei |
| 7,294,026 B1 * | 11/2007 | Donnell ............... H01R 9/2408 439/701 |
| 7,328,654 B2 | 2/2008 | Shei |
| 7,385,160 B2 | 6/2008 | Jones |
| 7,762,636 B2 | 7/2010 | Veeser et al. |
| 7,858,906 B2 | 12/2010 | Veltrop et al. |
| 7,877,208 B1 * | 1/2011 | Battista ................. H04L 12/403 342/457 |
| 8,091,472 B2 | 1/2012 | Maciejewski et al. |
| 8,096,231 B2 | 1/2012 | Veltrop et al. |

(Continued)

OTHER PUBLICATIONS

Veltrop et al., Design U.S. Appl. No. 29/450,074, "Food Warmer", filed Mar. 15, 2013.

(Continued)

*Primary Examiner* — Nay Tun
(74) *Attorney, Agent, or Firm* — Marshall, Gerstein & Borun LLP

(57) ABSTRACT

A modular food holding cabinet has multiple food holding units or bins, which can be connected and disconnected from each other in multiple different configurations. Each bin can be set to its own temperature, independently of the others.

17 Claims, 5 Drawing Sheets

(56) References Cited

U.S. PATENT DOCUMENTS

| | | |
|---|---|---|
| 2001/0007322 A1 | 7/2001 | Shei et al. |
| 2003/0118706 A1 | 6/2003 | Veltrop |
| 2003/0154285 A1* | 8/2003 | Berglund ................ H04L 29/06 709/227 |
| 2004/0020915 A1 | 2/2004 | Shei |
| 2008/0023462 A1 | 1/2008 | Shei et al. |
| 2008/0302778 A1 | 12/2008 | Veltrop et al. |
| 2009/0266244 A1 | 10/2009 | Maciejewski et al. |
| 2011/0114624 A1* | 5/2011 | Chung .................. A47J 39/006 219/385 |
| 2012/0079699 A1 | 4/2012 | Veltrop et al. |
| 2014/0263269 A1 | 9/2014 | Veltrop et al. |

OTHER PUBLICATIONS

Veltrop et al., Design U.S. Appl. No. 29/494,683, "Food Warmer", filed Jun. 23, 2014.
"Modular Holding Cabinets", Product Catalog, Carter-Hoffmann, Mundelein, Illinois (Jan. 2014).

* cited by examiner

MODULAR FOOD HOLDING CABINET HAVING INDIVIDUALLY CONFIGURABLE FOOD HOLDING UNITS

BACKGROUND

Food warming units, which are also known as food holding ovens or food holding bins, are used in the food industry to keep pre-cooked foods hot until they are used. Such ovens and food warming apparatus allow precooked food items to be stored separately until needed. By way of example, when a fast-food restaurant receives an order for a sandwich, the sandwich is typically assembled on a food preparation table where the contents of certain sandwich items, a hamburger patty for example, can be removed from food warning units. Storing precooked foods in food warming units thus enables quick sandwich assembly and efficient order fulfillment.

Prior art food holding ovens come in various fixed sizes but are not reconfigurable once they are installed. Such fixed-sized units thus limit food preparation layouts, which may change over time or have to be modified or altered for numerous reasons. For example, as restaurants add or change menus items, food preparation layouts might need to be adjusted. Fixed dimensional heating units limit the degree to which the food preparation layouts may be reconfigured.

Similarly, when a restaurant kitchen is remodeled existing fixed ovens and food warming apparatus might not be properly sized for the reconfigured kitchen. This can necessitate having to purchase one or more new ovens or warming apparatus at considerable expense or necessitate an undesirable or inefficient kitchen layout. Current food holding bins/ovens and warming units are not reconfigurable. A need exists for a more flexible apparatus.

DETAILED DESCRIPTION

Figure 1:
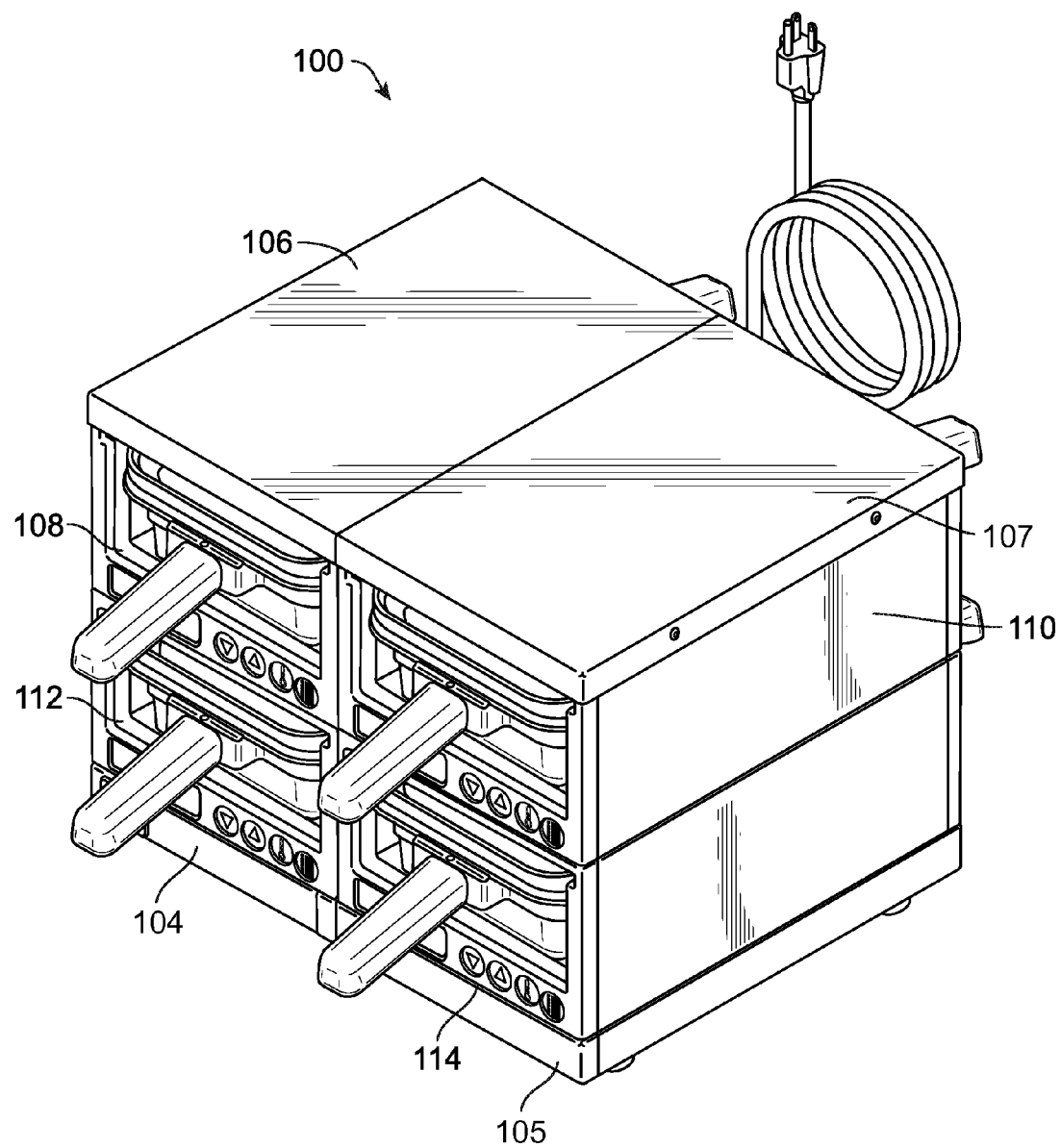
FIG. 1 illustrates a modular heating unit with four modular heating bins.

FIG. 1 illustrates a modular heating unit 100. It includes a first base unit 104, a second base unit 105, a first top cover 106, a second top cover 107 and four modular heating units, 108, 110, 112, and 114. The modular heating units 108, 110, 112, and 114 are also referred to interchangeably herein as food holding bins 108, 110, 112, and 114.

Two food holding units 108, 112 on the left-hand side are vertically stacked. Of the two food holding units 108, 112 on the left-hand side, the lower one of them (food holding unit 112) is stacked above and attached to the first base unit 104.

Two food holding units 110, 114 on the right-hand side are vertically stacked. Of the two food holding units 110, 114 on the right-hand side, the lower one of them (food holding unit 114) is stacked above and attached to the second base unit 105.

Figure 2:
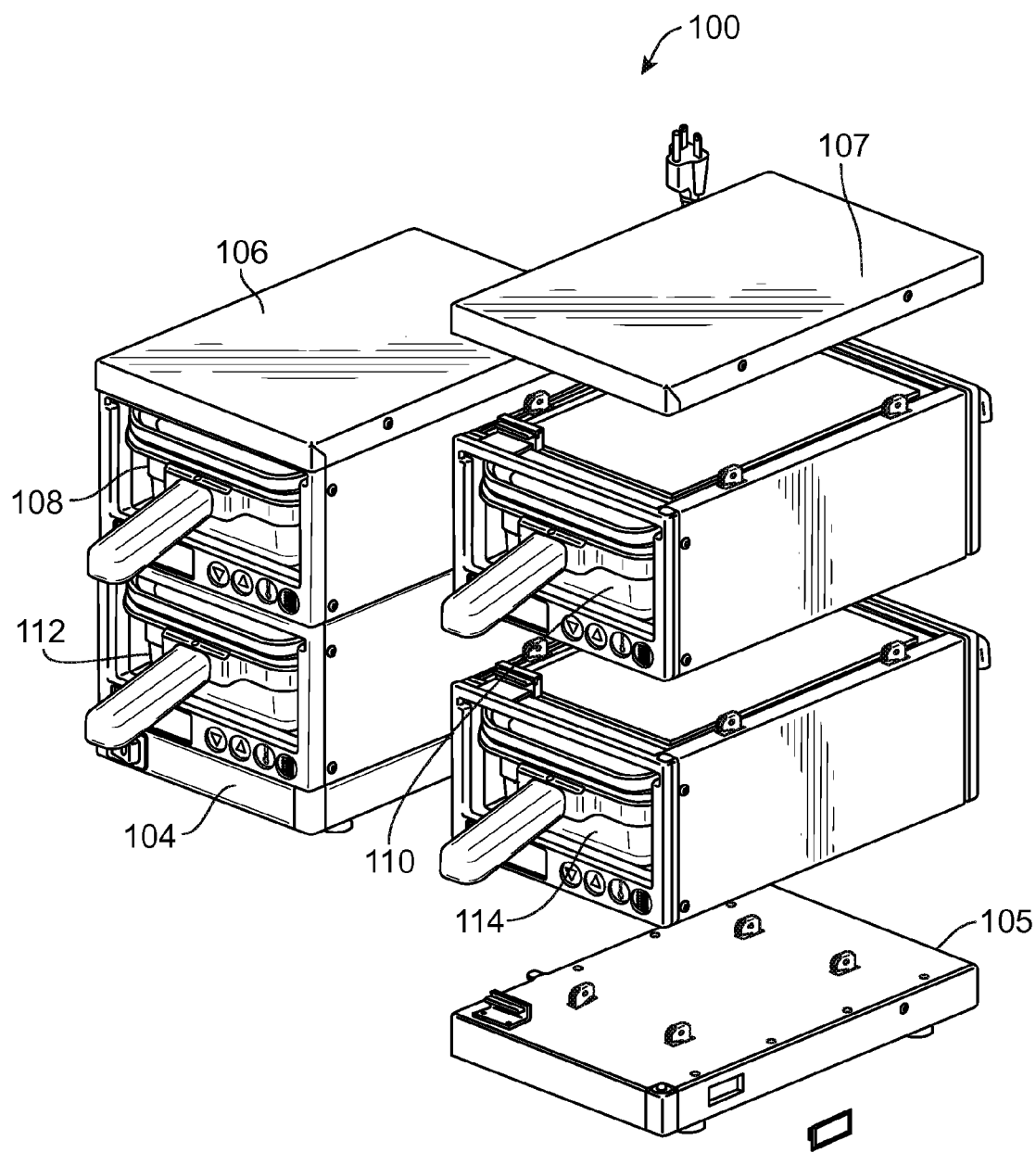
FIG. 2 illustrates modular heating units in various different positions.

The food holding units 108, 110, 112, and 114 are functionally equivalent to prior art food holding cabinets in the sense that they provide heat energy to pre-cooked food products placed into the food holding units. The food holding units 108, 110, 112, 114 are therefore electrically and mechanically connected to a base unit and covered. More particularly, food holding units 108 and 112 are connected to base unit 104; food holding units 110 and 114 are connected to base unit 105. Food holding units 108 and 112 are covered by the first cover 106; food holding units 110 and 114 are "covered" by the second top cover 107. As shown in FIG. 2, however, the food holding units can be physically disconnected from each other and re-connected in different configurations.

FIG. 2 is a partially exploded view of the modular heating unit 100 shown in FIG. 1. FIG. 2 illustrates what is referred to herein as a "2×2" arrangement of four food holding units 108, 110, 112, and 114.

The four modular heating bins 108, 110, 112, and 114 can be disconnected and re-connected to each other in different physical configurations yet have each unit retain different corresponding functionalities, so long as their configuration provides an electrical pathway through at least one unit 108, 110, 112, 114 to a master controller located in the base unit 104. By way of example, the units can be arranged as shown in FIG. 1 with two columns and two rows of modular heating bins. Four units can also be arranged such that there is one column of four, vertically-stacked bins or one horizontal row of four, horizontally-aligned bins. Four bins can also be arranged such that there is a one column of three bins stacked vertically and one bin in another column. Other numbers of bins/units can be arranged in different configurations as long as they are all linked to the base unit 104.

The food holding units 108, 110, 112, 114 are individually addressable and individually controllable from the base unit 104 in the modular heating unit 100. The individual addressability and individual controllability is provided by a unique network 300 that connects the food holding units 108, 110, 112, 114 to the base unit 104. The topology of the network 300 is depicted in FIG. 3.

As used herein, the term bus refers to a conductor, or group of electrically-parallel conductors, that serves as a common connection for two or more circuits.

As used herein, the terms poll and polling refer to processes by which a computer, controller or data acquisition system selectively requests data or information from one or more remote devices or terminals. A poll or polling message will cause a remote terminal to respond with a signal, a message or data.

Figure 3:
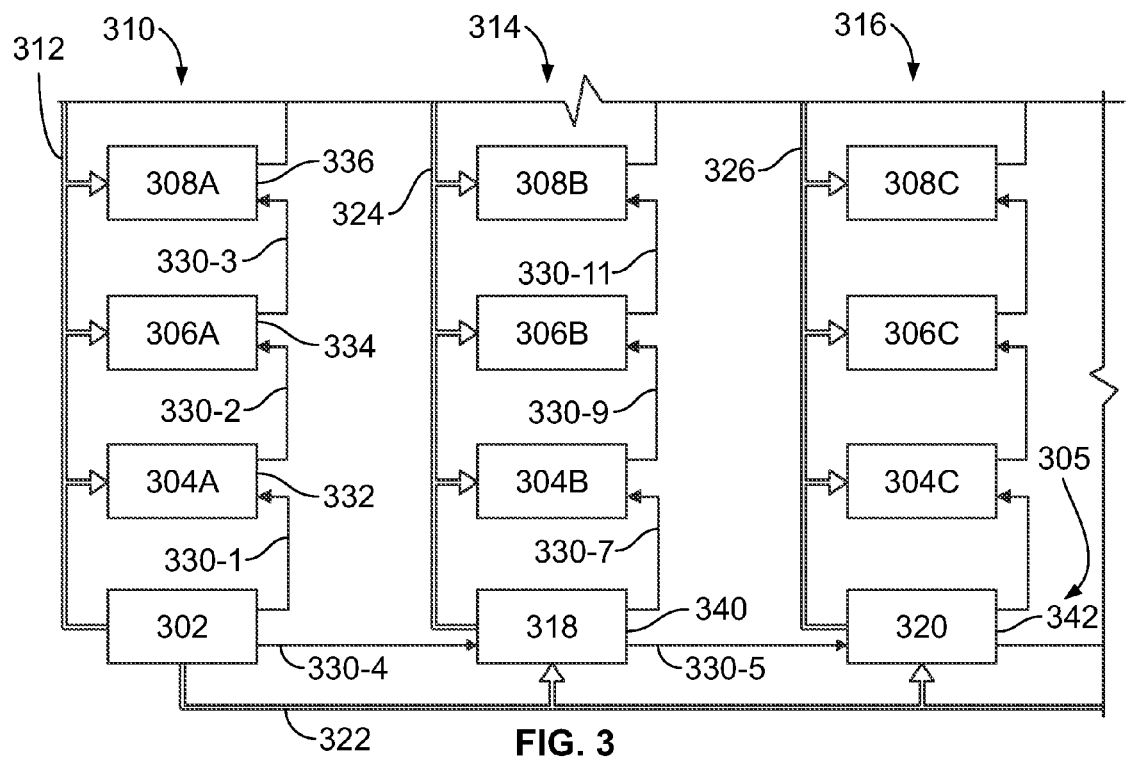
FIG. 3 depicts several modular heating units operatively coupled to a master controller through a network that comprises other modular heating units, communications busses and single, interrogation wires that extend between physically-adjacent devices.

Referring now to FIG. 3, the network 300 comprises a master controller 302 operatively connected to a matrix of "slave" food holding units that can be arranged in columns and rows as shown in FIG. 2. In FIG. 3, food holding units 304A, 306A and 308A as well as the master controller food holding unit 302, comprise a first vertical "column" 310 of units stacked on top of each other. Units 304A, 306A and 308A are physically supported by and electrically coupled to the master controller 302.

The food holding units 304A, 306A and 308A are communicatively coupled to the master controller by way of a "first" communication bus 312 that extends between only the master controller 302 and the food holding units 304A, 306A and 308A. In addition to being coupled to the master controller by the bus 312, the first unit 304A is also coupled to the master controller through an interrogation signal wire 330-1, which is referred to interchangeably as a polling signal wire. A signal on the interrogation signal wire or polling signal wire is detected by a food holding unit to which the wire is connected. The reception or detection of a "signal" on the wires 330-1-330-n, gives permission to the food holding unit receiving the signal to respond to global polling messages onto a communications bus to which the food holding unit is connected. The message transmitted onto the communications bus "notifies" the master controller that the food holding unit to which the interrogation signal wire/polling wire is attached, is waiting for an address to be assigned to it by the master controller.

Still referring to FIG. 3, the second food holding unit 306A in the first column 310 is coupled to the first food holding unit 304A through a second interrogation signal wire 330-2. The third unit 308A in the first column 310 is coupled to the second unit 306A through a third poling wire 330-3. The poling wires 330-1, 330-2 and 330-3 are not connected to each other but extend between only the food holding units as shown in FIG. 3.

FIG. 3 also shows a single horizontal row 305 of "slave" control units 318 which are laterally-adjacent to the master controller 302 and coupled to the master controller 302 via a communications bus 322, which extends between only the master controller 302 and the slave control units 318, 320.

In addition to being coupled to the master controller 302 via a communications bus 322, the "first" slave control unit 318 is coupled to the master controller 302 by way of an interrogation signal wire 330-4 that extends between only the master controller 302 and the first slave control unit 318. A second interrogation signal wire 330-5 extends between the first slave control unit 318 and the second slave control unit 320. The single row 305 thus comprises the master controller 302 and several, horizontally-connected slave control units 318, 320, so named because they receive commands sent to them from the master controller 302 and respond accordingly but are also able to act as "master" controllers to food holding units stacked above them.

The row 305 is depicted in FIG. 3 as extending to the "right" of the master controller 302 but can in fact extend to the left of the master controller as well as both left and right sides of the master controller 302. The number of units in a column and the number of units in rows is a design choice.

The master controller 302 controls the slave food holding units 304A, 306A and 308A that are arranged in the "first" vertical column 310. The control of those vertically-stacked slave food holding units is accomplished by the master controller 302 assigning a unique address to each of unit 304A, 306A and 308A such that bi-directional communications can take place between the master controller 302 and a slave food holding unit 304A, 306A, 308A using the first communication bus 312, which is a conventional multipoint communications bus.

The master controller 302 detects and assigns addresses by sending a sequence of four messages exchanged between the master controller and a food holding unit located above the master controller. The first message sent to a food holding unit is actually a D.C. voltage applied to the interrogation signal wires that extend between adjacent food holding units. The D.C. voltage sent to a food holding unit on an interrogation signal wire 330 causes a food holding unit receiving the D.C. voltage to "wake up," or monitor the communication bus 312. After the D.C. voltage is applied to an interrogation signal wire, the master controller transmits a "dummy" message on the communications bus 312 to an "undiscovered" food holding unit. After the master controller transmits the dummy message, the master controller waits for a response on the communications bus. When the master controller receives a response to its dummy message, the master controller transmits an address assignment message on the bus. When the address assignment message is received by the food holding unit to which the wake up signal was sent, the food holding unit stores an address contained within the address assignment message and thereafter communicates using only the received address.

In an alternate embodiment, the first message is a D.C. voltage applied to the interrogation signal wire. The second message is the address assignment message sent by the master controller to the food holding unit to which the interrogation signal wire is connected. A third message, sent from the food holding unit to the master controller, is a response to the address assignment message and which confirms receipt of the address assignment message.

In FIG. 3, the food holding unit 304A is detected by the master controller 302 applying a D.C. voltage to the wire 330-1 that extends to the first vertically-adjacent food holding unit 304A. The master controller 302 then broadcasts a polling message on the bus 312. Upon receipt of the polling message, the food holding unit 304A that received the D.C. voltage responds to the polling message with an acknowledge message sent to the master controller over the bus 312. The master controller 302 then transmits an address assignment to the food holding unit 304 that transmitted the acknowledge message.

In a preferred embodiment the electrical signal transmitted or applied to the wire 330-1 is a D.C. voltage, typically less than twelve volts. The first communication bus 312 is a serial bus that uses the well-known RS-485 communications protocol, further description of which is omitted for brevity because the RS-485 standard is well known. The master-to-slave and slave-to-master detection and registration process is described below.

In addition to be coupled to the food holding units 304A-308A that are vertically stacked above it, the master controller 302 is also coupled to other columns 314 and 316 of slave holding units 304B-308B and 304C-308C through horizontally-adjacent slave bus controllers 318 and 320, which are coupled to the master controller 302 through an electrically separate communications bus 322 and which are coupled to each other by D.C. voltage-carrying signaling wires 330-4 and 330-5.

The horizontally-adjacent slave bus controllers 318 and 320 are so named because they act as bus controllers for food holding units that are stacked vertically above them but are "slaved" to the master controller 302. The slave bus controllers 318, 320 communicate with corresponding "columns" of slave food holding units 304B-308B and 304C-308C through corresponding communications buses 324 and 326 that extend from each slave bus controller to the columnar-oriented food holding units.

The ability to detect if a slave food holding unit is at a particular column/row location is provided by a method of detecting the presence of a food holding unit that obviates the need to assign or provide addresses to the food holding units but instead enables the food holding units to receive unique assignment identifications when they are installed into the network 300 and powered up. The assignment of an address to a food holding unit is performed by the master controller such that the master controller can become aware of the presence of any food holding unit that is plugged into any location along any of the communication buses 312, 322, 324 and 326.

Detecting and assigning an address to a food holding unit is accomplished by the network elements 302-308 asserting a voltage on a wire that extends from a first network element to a second the receipt of which by a second network element enables or permits a network element to transmit a response message on one of the communications buses 312, 322, 324 or 326.

By way of example, the master controller 302 detects the presence or absence of a slave food holding unit by applying a voltage to the interrogation signal wire 330-1, which extends from the master controller 302 to only the first vertical location 332 in the network 300 where a slave food holding unit might be installed. If a slave food holding unit 304A is installed at that first location 332, the slave food holding unit 304A, having been given "permission" to transmit onto the bus by the voltage on the interrogation signal wire 330-1, transmits a message onto the communications bus 312. When the message from a food holding unit is detected by the controller 302, the controller 302 considers the response from the food holding unit to be indicative of the presence of the slave food holding unit at that first location 332. The master controller 302 thereafter transmits an address assignment message on to the communications bus 312 which is received by the slave food holding unit 304A at the first location 332 the receipt of which enables subsequent communications between the controller 302 and the slave food holding unit 304A to take place via the communications bus 312, regardless of the status of the signal or voltage on the interrogation signal wire 330-1. An address is assigned to food holding units so that subsequent communications with food holding units do not require the use of the interrogation signal wires 330-1-330-n.

In order to detect the presence of second and third slave food holding units in the first column 310, the slave food holding unit at the first location 332 first assumes the role of a controller vis-à-vis a food holding unit 306A that might be installed at a corresponding second location 334. If a second slave food holding unit 306A is detected at the second location 334, the second slave food holding unit 306A at the second location 334 assumes the role of a controller vis-à-vis a food holding unit 308A that might be installed at a corresponding third location 336.

A second food holding unit is determined to be present or absent from a logically adjacent second location 334 in the column 310 by way of a voltage signal transmitted from the first slave unit 304A at the first location 332 on a second and different interrogation signal wire 330-2, which extends between only the first and second locations 332, 334 in the first column 310. The D.C. voltage applied to an interrogation signal wire is referred to interchangeably as a first type of message or signal or simply a "first message." It is applied to the second interrogation signal wire 330-2 responsive to a command to do so, which is sent to the first slave unit 304A by the master controller 302.

After the "first type of message" is transmitted to the second location 334 by the first slave unit, the master controller 302 sends a dummy "polling" message onto the bus 312. If the second slave unit 306A is present, it will respond to the polling message because the first type of message enables or authorizes the second slave unit 306A to respond to the master controller's polling message. The response of the second slave unit 306A to the polling message is also sent over the communications bus 312.

When the master controller 302 detects a response to its polling message from the second slave food holding unit 306A at the second vertical location 334, the master controller 302 recognizes that a food holding unit is present at the second location 334. The master controller 302 will thereafter transmit a third message, which is the address assignment message to the second slave food holding unit 306A at the second location 334 above the master controller 302. The address assignment message transmitted onto the bus 312 contains a unique address that is used by the second slave food holding unit 306A for subsequent communications. If no response is received by the master controller 302 from the second location 334, the master controller 302 considers the second location 334 to be unoccupied.

The message sent to the master controller 302 by a slave food holding unit responsive to the slave food holding unit's receipt of a polling message or signal is referred to herein interchangeably as an address assignment request message as well as an address request message. If an address request is not received by the master controller 302 after transmitting the first type of signal on an interrogation signal wire and the polling message on the bus, the master controller 302 considers the location to which the first type of signal was sent as being unoccupied.

When the slave control unit 318 receives an address from the master controller 302, the slave control unit 318 thereafter becomes a pseudo-master controller to the food holding units 304B, 306B, 308B . . . , vertically stacked above and communicatively coupled to the slave control unit 318 via interrogation signal wires 330-7, 330-9, 330-11 and a third communications bus 324 that extends between the slave control unit 318 and all of the vertically stacked food holding units in the second column 314.

In order to detect whether slave control units 318, 320 might be present in an adjacent vertical column 314, 316, the master controller 302 first asserts or transmits the first type of message on an interrogation signal wire 330-4 that extends from the master controller 302 to a laterally-adjacent slave control unit 318, which is in turn able to communicate both vertically and horizontally as described above and hereinafter. Just as the master controller 302 does with slave holding units located above the master controller 302, after the first type of message is provided to the interrogation signal wire 330-4, the master controller 302 transmits a dummy polling message on a second communication bus 322 that extends between the master controller 302 and the slave control units 318, 320. If a slave control unit 318 is in fact present at the first laterally adjacent location 340, the slave control unit 318 at that location will respond to the polling message by transmitting an address request message to the master controller 302 on the second communications bus 322. When the address request message from the slave control unit 318 is received by the master controller 302, the master controller 302 transmits an address assignment message to the slave control unit 318, again, on the communications bus 322. Upon the receipt of the address assignment message, the slave control unit 318 will thereafter act as a "master" controller to food holding units located above the slave control unit 318 and which comprise the second column 314 of food holding units.

The detection of food holding units 304B, 306B, 308B in the second column 314 and the assignment of addresses to them is performed by the master controller 302 using the process/method described above with respect to the master controller 302 and the food holding units 304A, 306A, 308A in the first column 310. The slave control units 318, 320 do not assign address nor do they detect food holding units above them. Addresses are assigned to food holding units 304B, 306B and 308B by the master controller 302 by way of messages it transmits over the second communications bus 322 to the slave control unit 318, which passes the messages onto the third communications bus 324.

The detection of food holding units in a third column 316 of food holding units 304C, 306C and 308C and the assignment of unique addresses to them is performed in the same way that food holding units 304B, 306B and 308B are detected in the second column 314 and addresses are assigned to them. The description of the process for the third column 316 is therefore omitted in the interest of brevity.

Figure 4:
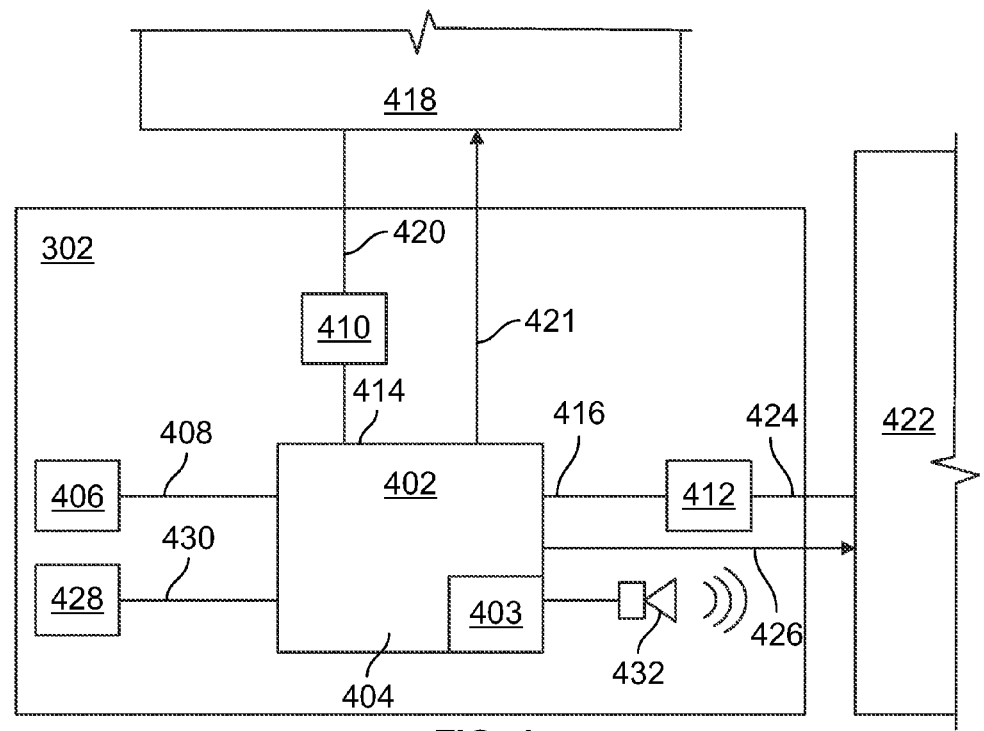
FIG. 4 is a block diagram of a master controller for the modular heating unit.

FIG. 4 is a block diagram of a master controller 302 depicted in FIG. 3. A signal-chip microcontroller 402 having non-transitory memory devices 403 co-located on the same semiconductor die 404 executes program instructions that are stored in the "on-chip" memory 403. Those instructions cause the processor 402 to perform various operations to detect the presence of logically-adjacent food holding units and communicate with them via one or more communications busses.

The processor 402 is also electrically coupled to a memory device, typically an EEPROM 406 through a conventional address/data/control bus 408. System configuration data, e.g, menus and settings, are stored in the memory device 406.

The processor 402 is coupled to two RS-485 transceivers 410 and 412, which are coupled to the processor 402 through corresponding ports 414 and 416. The first RS-485 transceiver 410 is coupled to a column-adjacent slave module 418, i.e., a slave module in the same column 310, through an RS-485 compliant communications bus 420 and an interrogation signal wire 421.

The second RS-485 transceiver 412 is coupled to a slave control unit 422, also referred to as an expansion base 422 through an interrogation signal wire 426 on which a voltage can be applied and a RS-485-compliant bus 424.

Figure 5:
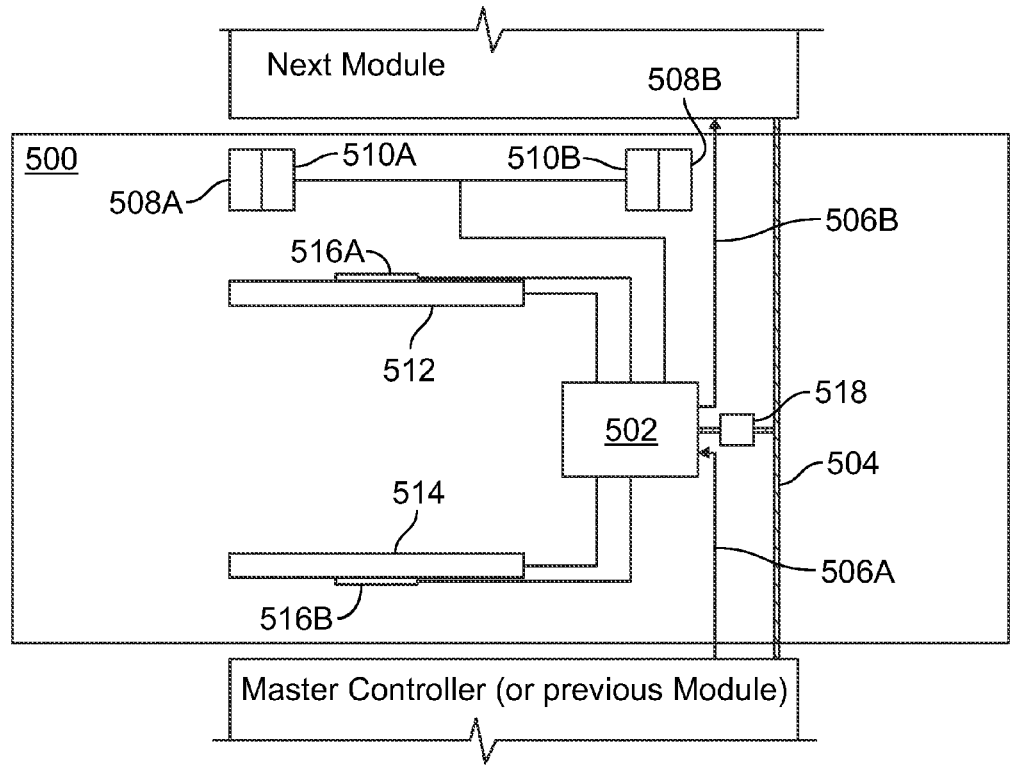
FIG. 5 is a block diagram of a slave food holding unit.

FIG. 5 is a block diagram of a slave food holding unit 500. Such a food holding unit would be located and operating in one of the locations 304-308 in FIG. 3. It is comprised of a microcontroller 502 coupled to either the master controller 302 or a "previous module" in the network 300 by way of a communications bus 504 and an interrogation signal line 506 on which the aforementioned "first type of message" is transmitted to the processor 502 for the slave food holding unit 500.

Reference numeral 506A represents an incoming interrogation signal wire or line that is connected to an input terminal of the microcontroller 502. 506B represents an outgoing interrogation signal wire or line by which the slave food holding unit 500 can assert the incoming interrogation signal wire of the "next module." 518 identifies an RS-485 transceiver, which allows the microcontroller 502 to communicate on the bus 504.

Each slave food holding unit 500 in the modular heating unit 100 is provided with a touch-sensitive control panel 508A/510A and 508B/510B and a display board 510. A combined assembly of 508A and 510A comprise a forward-facing control panel for the food holding unit 500, i.e., a control panel that is on a front side of the food holding unit 500. A combined assembly of 508B and 510B represent the rearward-facing control panel. Upper and lower heating elements 512, 514 are controlled by the microcontroller 502 to maintain a required temperature that is assigned food to the unit 500 by the master controller 302.

Semiconductor temperature sensors 516A and 516B, preferably embodied as bipolar junction transistors having a p-n junction, which is mechanically coupled to the heating elements, the current of which is temperature-dependent, enable the processor 502 to monitor the temperature in the food holding unit 500 and apply or reduce current to the upper heaters 512 and lower heater 514 respectively.

Figure 6:
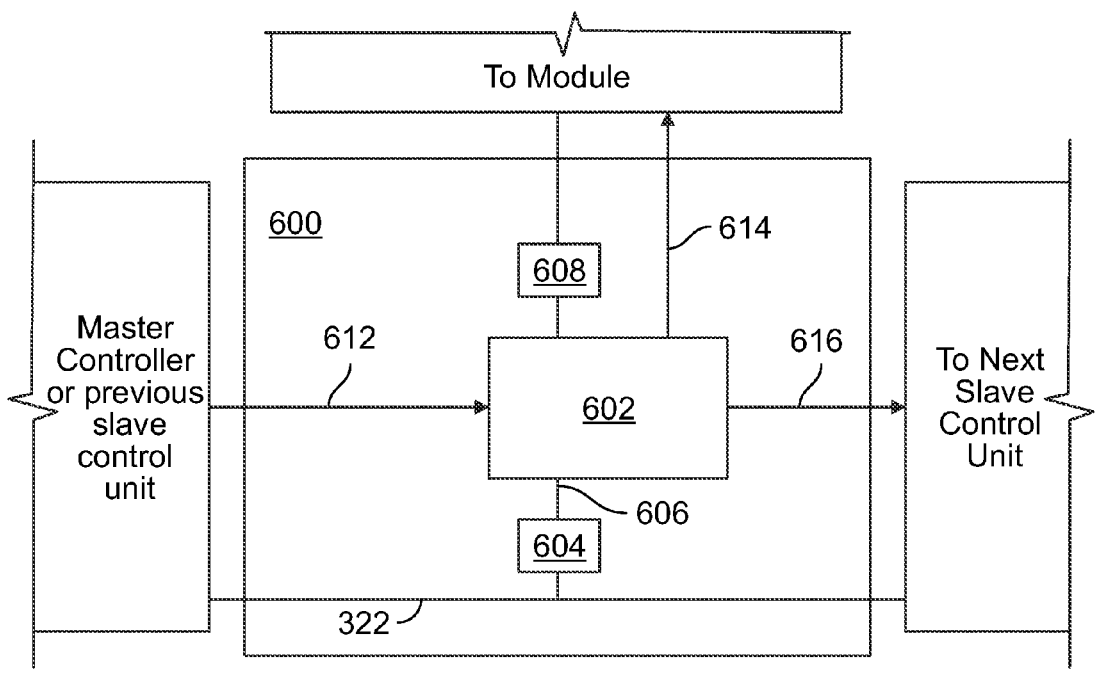
FIG. 6 is a block diagram of an expansion controller or slave control unit, which enables the master controller to communicate with slave food holding units in different columns.

FIG. 6 is a block diagram of an expansion controller or slave control unit 600, which when installed in the network shown in FIG. 3 enables the master controller 302 to communicate with slave food holding units in different columns 314 and 316. The expansion controller 600 comprises a processor 602 coupled to a RS-485 transceiver 604, which couples the processor 602 to a conventional address/data/control bus 606. The transceiver 604 is coupled to the communications bus 322. A second RS-485 transceiver 608 enables the processor 602 to communicate with slave food holding units located "above" the expansion controller 600 in a column.

In FIG. 6, reference numeral "612" identifies an incoming signal wire on which the aforementioned first type of message is sent to the slave control unit 600. Reference numeral "614" identifies an outgoing signal wire on which the slave control unit 600 can send the "first type of message" to a first vertical unit in a column that extends upwardly from the slave control unit 600. Reference numeral "616" is an outgoing signal wire on which the slave control unit 600 can send the "first type of message" to a horizontally-adjacent next slave control unit.

Figure 7:
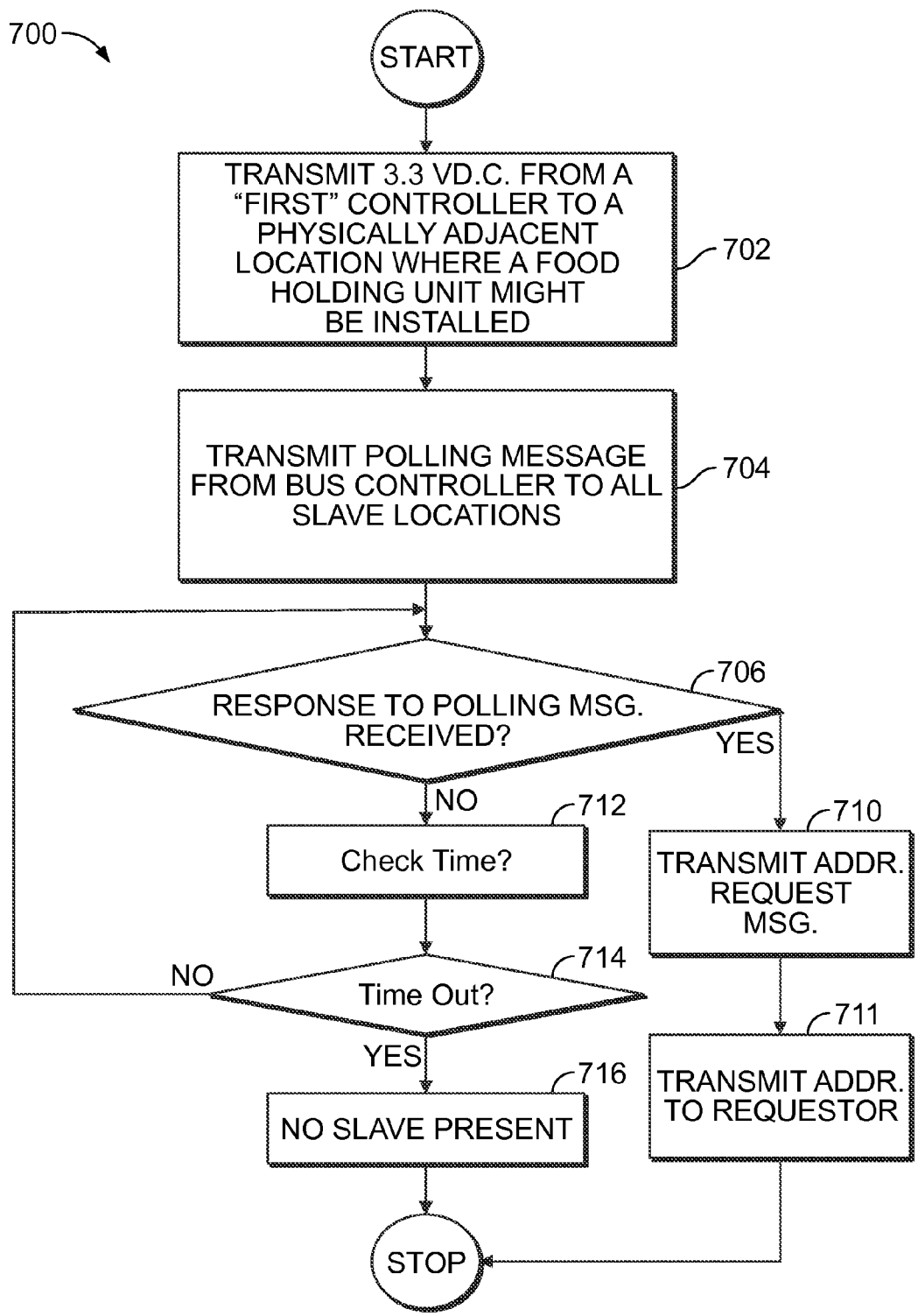
FIG. 7 is a flowchart depicting steps of a method 700 for controlling a modular food holding cabinet, such as the one shown in FIGS. 1 and 2.

FIG. 7 is a flowchart depicting steps of a method 700 for providing a modular food holding cabinet, such as the one shown in FIGS. 1 and 2 and which employ a network such as the one depicted in FIG. 3 that is able to detect and control food holding units connected to each other in different configuration. In a first step 702, a "first type of message" is transmitted on a single conductor or wire that extends between a controller and a location where a device might be installed. In a preferred embodiment such a message is simply a DC voltage applied to the wire. In an alternate embodiment, however, such a signal could just as well be an AC voltage, the magnitude and frequency of which can be selected as a design choice. Serial data could also be transmitted. As stated above, the first type of message gives a receiving food holding unit "permission" to transmit onto a communications bus.

After the "first type" of messages transmitted on the wire connecting the controller to a slave unit location, at the next step 704, a polling message is transmitted from the master controller. The polling message is essentially a wake up message transmitted on a communications bus that extends from the master controller to all slave locations in the modular heating cabinet. If a slave unit was present when the voltage on the first wire was asserted and the polling message is detected at step 706, at step 710 the slave unit will respond to the polling message sent at step 704 by transmitting an address request message to the controller. Upon the controller's receipt of the address request message, at step 711, the master controller transmits a unique address to the slave unit requesting the address. The address assignment message will be stored by the processor in the slave unit and thereafter be used by the slave unit and the controller to communicate between those two devices.

Referring again to step 706, if no response to the polling message is received, at steps 712 and 714 a timer/counter is checked to see if a response might still come. If no response is received within a defined period of time, additional attempts to communicate are aborted and the master controller no longer attempts to communicate with a slave unit at this position.

Those of ordinary skill in the art will realize that FIG. 3 shows slave control units electrically connected in series to each other by virtue of the single, interrogation signal wires that extend between electrically and mechanically adjacent food holding units as shown in FIG. 3. Each of the slave food holding units thus has a single, signal interrogation wire that extends from one to another. Each of the slave food holding units also has a communications bus that extends between it and a controller. Those of ordinary skill in the art will also recognize that the food holding units that form columns of food holding units are electrically connected in series by virtue of the interrogation signal wires that extend between the master controller and the slave food holding units described above.

The various communications buses are also electrically isolated from each other. A first communications bus extends from the controller to the first column of slave food holding units. A second communications bus extends from the controller to each of the dual-mode slave controllers at the bottom of each other vertical column of slave food holding units. A third communications bus and fourth communications bus extends vertically in each column. The various communications buses are electrically isolated from each other but in an alternate embodiment, a single communications bus can be routed to each of the locations in the matrix depicted in FIG. 3.

Those of ordinary skill in the computer network art know that a media access control address (MAC address) is a unique identifier that is assigned to each network interfaces for communications on a physical network. MAC addresses are used as a network address for most IEEE 802 network technologies as well as Ethernet networks. They enable each device on a network to be communicated with individually.

The method and apparatus described above enable food holding units in a modular food holding cabinet to be uniquely addressable and controllable over a bus, without requiring the food holding unit to be manufactured or constructed with a unique hardware address, such as a MAC address. The food holding units are instead manufactured without an address pre-assigned to them. A food holding unit is instead assigned a unique address, functionally equivalent to a MAC address, each time it is installed into the modular holding cabinet. A food holding unit can thereafter be re-assigned new addresses, each time it is installed into a modular cabinet. The food holding units can thus be re-configured as needed and re-used in different configurations.

The foregoing description is for purposes of illustration only. The true scope of the invention is set forth in the following claims.

What is claimed is:

1. In a modular food holding device having a plurality of individually addressable and individually controllable food holding units, each of which is capable of being installed and used at different physical locations of the modular food holding device, a method of detecting and controlling a food holding unit in the modular food holding device, the method comprising the steps of:
    transmitting a first message over a first conductor that extends between a first controller and a first food holding unit at a first physical location in the modular food holding device;
    transmitting a second message over a second conductor that extends between the first physical location and a second physical location in the modular food holding device, the first and second conductors being electrically isolated from each other;
    transmitting, from the first controller, a polling message onto a first bus, the first bus extending from the first controller to a first plurality of physical locations in the modular food holding device, the first plurality of physical locations including the first physical location and the second physical location;
    determining that a second food holding unit occupies the second physical location based on receiving, at the first controller, a response to the polling message sent from the second food holding unit and over the first bus, wherein the second message provided permission to the second food holding unit to communicate over the first bus; and
    transmitting, from the first controller and over the first bus, a first identification assignment message to the second food holding unit at the second physical location, the first identification assignment message indicating an address at which the second food holding unit receives subsequent communications over the first bus.

2. The method of claim 1, wherein receipt of the first identification assignment message enables the first controller to conduct bi-directional communications with the second food holding unit.

3. The method of claim 1, further comprising:
    determining that no food holding units have been installed at the second physical location when no response to the polling message is received.

4. The method of claim 1, wherein the first controller is a master controller and the modular food holding device comprises a plurality of slave controllers, each slave controller being a bus controller for a corresponding bus that extends between the slave controller and a plurality of food holding units, wherein the step of transmitting the polling message is performed by a first slave controller.

5. The method of claim 4, further comprising:
    transmitting a third message on a third conductor that extends between a first slave controller of the plurality of slave controllers and a third physical location in the modular food holding device whereat a food holding unit can be installed;
    transmitting the polling message onto a second bus, the second bus extending from the first slave controller to a second plurality of locations in the modular food holding device, wherein the second plurality of locations includes the third physical location;
    determining that a third food holding unit occupies the third physical location based on receiving, at the first slave controller, a response to the polling message sent from the third food holding unit and over the second bus, wherein the third message provided permission to the third food holding unit to communicate over the second bus; and
    transmitting, from the first slave controller and over the second bus, a second identification assignment message to the third food holding unit at the third physical location, the second identification assignment message indicating an address at which the third food holding unit receives subsequent communications over the second bus.

6. The method of claim 5, further comprising:
    determining that no food holding units have been installed at the third physical location when no response to the polling message is received at the expiration of a predetermined length of time.

7. The method of claim 1, further comprising:
    conducting bi-directional communications with a plurality of food holding units installed in a plurality of different locations using corresponding addresses that were assigned and transmitted to each unit.

8. The method of claim 1, wherein the first message is a D.C. voltage applied to the first conductor.

9. The method of claim 1, wherein the first bus is substantially compliant with the RS-485 communications standard.

10. A modular food holding device having a plurality of individually controllable and individually configurable food holding units, the modular food holding device comprising:
   a master controller food holding unit;
   a first plurality of food holding units coupled (i) in series to each other and (ii) coupled to each other and to the master controller food holding unit by a first communications bus;
   a first slave control unit coupled to the master controller food holding unit in series by (i) an interrogation signal wire and by (ii) a third communications bus, the first slave control unit configured to be a slave to the master controller food holding unit; and
   a second plurality of food holding units coupled in series to each other and coupled to the first slave control unit by a second communications bus.

11. The modular food holding device of claim 10, wherein the first, second, and third communications busses are electrically separate from each other.

12. The modular food holding device of claim 10, wherein food holding units in the first and the second pluralities of food holding units are configured to (i) receive a first interrogation message on a first input port, (ii) receive an identification assignment message on a second input port and (iii) output a second interrogation message from a first output port, the first input port and the first output port being electrically separate from each other.

13. The modular food holding device of claim 10, wherein the first and second communications busses comprise first and second electrically parallel conductors.

14. The modular food holding device of claim 10, wherein the first plurality of food holding units are electrically connected in series to each other by wires that extend between electrically adjacent food holding units, the wires including a first wire being connected between a first and a second food holding unit, and a second wire being connected between the second and a third food holding unit, wherein the first and second wires are electrically isolated from each other.

15. The modular food holding device of claim 14, wherein the second plurality of food holding units are electrically connected in series to each other by wires that extend between electrically adjacent food holding units, the wires including a third wire being connected between a fourth and a fifth food holding unit, and a fourth wire being connected between the fifth and a sixth food holding unit, the third and fourth wires being electrically isolated from each other and electrically isolated from the first and second wires.

16. The modular food holding device of claim 10, further comprising:
   a second slave control unit coupled in series to the first slave control unit and coupled to the first slave control unit and to the master controller via the third communications bus; and
   a third plurality of food holding units coupled to each other in series and coupled to each other and to the second slave control unit by a fourth communications bus, the fourth communications bus being electrically separate from the first, second, and third communications busses.

17. A non-transitory memory device storing program instructions thereon, that, when executed by one or more processors, cause a modular food holding device to:
   transmit a first message over a first conductor that extends between a first controller and a first food holding unit at a first physical location in the modular food holding device;
   transmit a second message over a second conductor that extends between the first physical location and a second physical location in the modular food holding device, the first and second conductors being electrically isolated from each other;
   transmit, from the first controller, a polling message onto a first bus, the first bus extending from the first controller to a first plurality of physical locations in the modular food holding device, the first plurality of physical locations including the first physical location and the second physical location;
   determine that a second food holding unit occupies the second physical location based on receiving, at the first controller, a response to the polling message sent from the second food holding unit and over the first bus, wherein the second message provided permission to the second food holding unit to communicate over the first bus; and
   transmit, from the first controller and over the first bus, a first identification assignment message to the second food holding unit at the second physical location, the first identification assignment message indicating an address at which the second food holding unit receives subsequent communications over the first bus.

* * * * *